(12) United States Patent
Liang et al.

(10) Patent No.: US 8,836,229 B2
(45) Date of Patent: Sep. 16, 2014

(54) LED DRIVER CIRCUIT

(75) Inventors: Tsorng-Juu Liang, Tainan (TW);
Wei-Ching Tseng, Kaohsiung (TW);
Yi-Chuan Tsai, Kaohsiung (TW);
Jiann-Fuh Chen, Tainan (TW)

(73) Assignee: National Cheng Kung University, Tainan (TW)

( * ) Notice: Subject to any disclaimer, the term of this patent is extended or adjusted under 35 U.S.C. 154(b) by 341 days.

(21) Appl. No.: 13/332,942

(22) Filed: Dec. 21, 2011

(65) Prior Publication Data

US 2012/0161650 A1    Jun. 28, 2012

(30) Foreign Application Priority Data

Dec. 22, 2010    (TW) ................................ 99145179 A

(51) Int. Cl.
*H05B 37/02*    (2006.01)
*H05B 33/08*    (2006.01)

(52) U.S. Cl.
CPC ........... *H05B 33/0812* (2013.01); *Y02B 20/348* (2013.01); *H05B 33/0818* (2013.01)
USPC ......... 315/224; 315/200 R; 315/291; 315/297

(58) Field of Classification Search
USPC .......... 315/185 R, 192, 200 R, 201, 205, 224, 315/250, 246, 253, 272, 291, 294, 312
See application file for complete search history.

(56) References Cited

U.S. PATENT DOCUMENTS 6,239,995 B1 *   5/2001   Weng et al. ..................... 363/89

* cited by examiner

*Primary Examiner* — Douglas W Owens
*Assistant Examiner* — Jianzi Chen
(74) *Attorney, Agent, or Firm* — Muncy, Geissler, Olds & Lowe, P.C.

(57) ABSTRACT

An LED driver circuit includes: a bridge rectifier, a first compensation capacitor, a second compensation capacitor, and an LED module. The bridge rectifier is connected to an AC input power for producing a rectification output power. The first compensation capacitor is connected to a first rectification output terminal and an AC input terminal of the bridge rectifier. The second compensation capacitor is connected to a second rectification terminal and the AC input terminal of the bridge rectifier. The LED module is connected to the first rectification output terminal and the second rectification output terminal of the bridge rectifier. The first and second compensation capacitors in the present invention can effectively improve the total current harmonic distortion of the LED module and its utilization.

11 Claims, 7 Drawing Sheets

| $V_{in(AC)}$ | $P_{in}$ | $P_{LED}$ | PF | THD | Efficiency | LED wattage variation |
|---|---|---|---|---|---|---|
| 100V | 2.1W | 1.85W | 0.91 | 46% | 88.1% | -16.67% |
| 110V | 2.7W | 2.22W | 0.935 | 37% | 82.22% | - |
| 120V | 3.3W | 2.56W | 0.95 | 33% | 77.6% | +15.3% |

FIG. 4(a)

| $V_{in(AC)}$ | $P_{in}$ | $P_{LED}$ | PF | THD | Efficiency | LED wattage variation |
|---|---|---|---|---|---|---|
| 100V | 2.5W | 2.2W | 0.903 | 22% | 88% | -15.4% |
| 110V | 3.1W | 2.6W | 0.912 | 19% | 83.9% | - |
| 120V | 3.7W | 2.95W | 0.918 | 17% | 79.7% | +13.46% |

FIG. 4(b)

LED DRIVER CIRCUIT

CROSS REFERENCE TO RELATED APPLICATION

This application claims the benefits of the Taiwan Patent Application Serial Number 099145179, filed on Dec. 22, 2010, the subject matter of which is incorporated herein by reference.

BACKGROUND OF THE INVENTION

1. Field of the Invention

The present invention relates to an LED (Light Emitting Diode) driver circuit and, more particularly, to an LED driver circuit capable of effectively reducing total current harmonic distortion of an LED module.

2. Description of Related Art

According to estimation from International Energy Agency (IEA), 19% of the electric energy in the world is consumed for illumination. As such, recently, numerous countries in the world are devoted themselves to replacing the low-efficiency incandescent lamp with high-efficiency light illuminating source. Accompanied by continuous and fast progress of the LED in luminous output and light-illuminating efficiency, the average cost for the light output of each lumen is decreased gradually. Therefore, illumination using the LED is becoming an important project for energy saving.

Currently, the industry has developed an AC LED suitably for use with AC power. The AC LED may directly use the AC power provided by the utility power, which has effectively overcome the problem of incapability of directly applying the LED in the AC power. However, there still has been an issue of improvement in manufacturing the AC LED. According to a general standard for illumination, the power factor of an LED lamp has to be above 0.9; the test value of the power factor needs to be above 95% of the nominal value; the total input power needs to be within 10% of the nominal value provided by a maker; and the current total harmonic distortion should not be above 33%. Thus, if the total input current harmonic distortion of an LED driver circuit is too high, the LED lamp will not be accepted by the standard, rendering it not advantageous in production. Therefore, it is desirable to provide an improved LED driver circuit to mitigate and/or obviate the aforementioned problems.

SUMMARY OF THE INVENTION

The object of the present invention is to provide an improved LED driver circuit, which is capable of effectively reducing total current harmonic distortion of an LED module, while increasing utility rate of the LED module.

To achieve the object, the LED driver circuit of the present invention comprises: a bridge rectifier including a first AC input terminal, a second AC input terminal, a first rectification output terminal and a second rectification output terminal, in which the first and the second AC input terminals are provided to receive an AC input power, and the first and the second rectification output terminals are provided to produce a rectification output power; a first compensation capacitor having a first terminal connected to the first rectification output terminal of the bridge rectifier and a second terminal connected to the second AC input terminal of the bridge rectifier; a second compensation capacitor having a first terminal connected to the second terminal of the first compensation capacitor and a second terminal connected to the second rectification output terminal of the bridge rectifier; and an LED module connected between the first and the second rectification output terminals of the bridge rectifier.

An essential feature of the invention lies in adding a first and a second compensation capacitors in the circuit structure, in which each of the first and the second compensation capacitors has a predetermined capacitance value such that the voltage sum across the first and the second compensation capacitors is not bigger than a peak voltage of the AC input power.

The invention may include a current limiting circuit connected between the LED module and the second terminal of the second compensation capacitor. The current limiting circuit includes a transistor and a resistor, in which a drain of the transistor is connected to the LED module, a source of the transistor is connected to a first terminal of the resistor, a gate of the transistor is connected to a second terminal of the resistor, and the second terminal of the resistor is connected to the second rectification output terminal. Preferably, the LED module includes a plurality of LEDs connected in series and parallel.

In addition, the bridge rectifier includes a first, a second, a third and a fourth diodes, in which cathodes of the first and the second diodes are connected to the first rectification output terminal, anodes of the first and the second diodes are respectively connected to the first AC input terminal and the second AC input terminal, cathodes of the third and the fourth diodes are respectively connected to the second AC input terminal and the first AC input terminal, and anodes of the third and the fourth diodes are connected to the second rectification output terminal. The first, the second, the third and the fourth diodes may all be an LED.

Other objects, advantages, and novel features of the invention will become more apparent from the following detailed description when taken in conjunction with the accompanying drawings.

BRIEF DESCRIPTION OF THE DRAWINGS

FIGS. 4(a) and 4(b) respectively show circuit feature lists when not adding and when adding a first and a second compensation capacitors according to the LED driver circuit of the invention;

DETAILED DESCRIPTION OF THE PREFERRED EMBODIMENT

Figure 1:
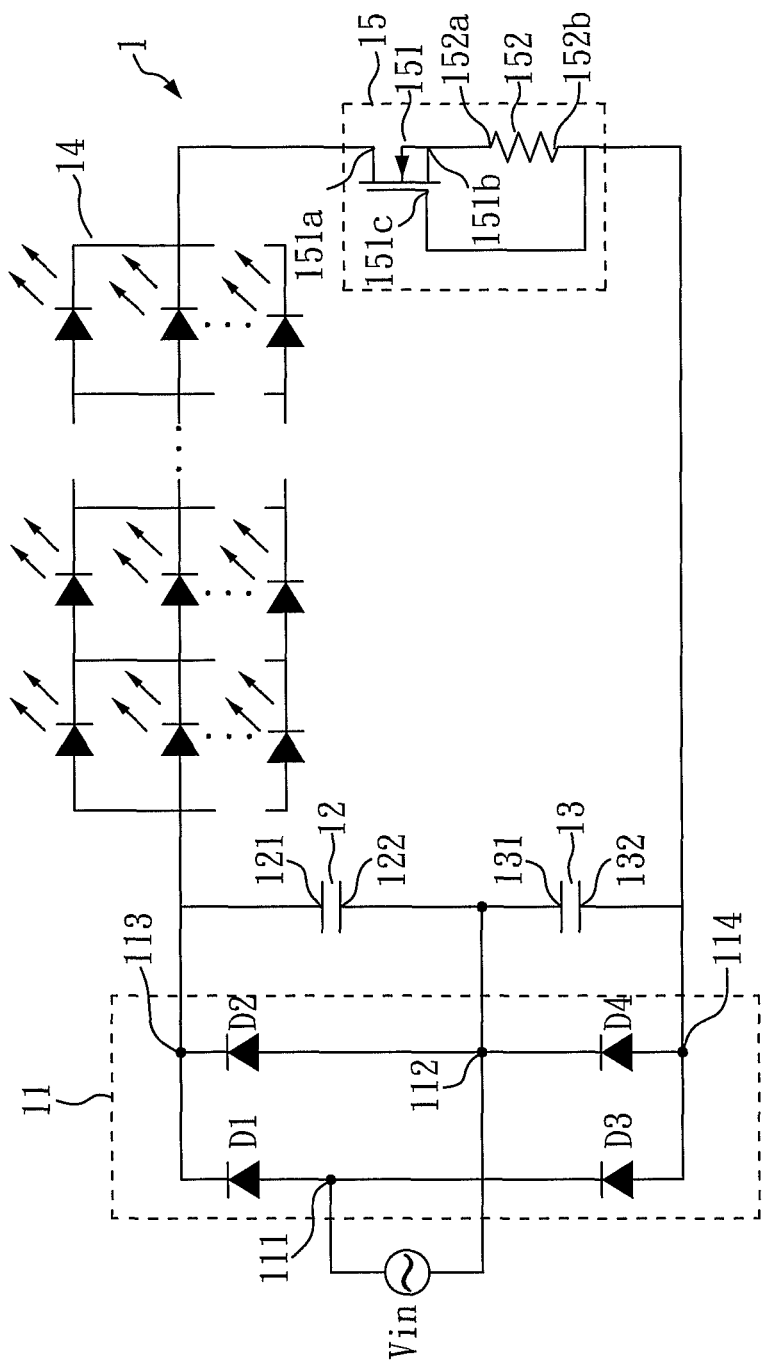
FIG. 1 is a circuit diagram of the LED driver circuit according to a first embodiment of the invention.

With reference to FIG. 1, there is shown a circuit diagram of an LED driver circuit according to a first embodiment of the invention. As shown, the LED driver circuit 1 of the present invention comprises a bridge rectifier 11, a first compensation capacitor 12, a second compensation capacitor 13, an LED module 14 and a current limiting circuit 15. The bridge rectifier 11 includes four diodes connected in a bridge type, including a first AC input terminal 111, a second AC input terminal 112, a first rectification output terminal 113, and a second rectification output terminal 114. The first AC input terminal 111 and the second AC input terminal 112 are electrically connected to an AC input power Vin, and the first rectification output terminal 113 and the second rectification output terminal 114 produce a rectification output power. The bridge rectifier 14 includes first to fourth diodes D1-D4, in which cathodes of the first and the second diodes D1, D2 are connected to the first rectification output terminal 113, anodes of the first and the second diodes D1, D2 are respectively connected to the first AC input terminal 111 and the second AC input terminal 112, cathodes of the third and the fourth diodes D3, D4 are respectively connected to the second AC input terminal 112 and the first AC input terminal 111, and anodes of the third and the fourth diodes D3, D4 are connected to the second rectification output terminal 114

Furthermore, a first terminal 121 of the first compensation capacitor 12 is connected to the first rectification output terminal 113 of the bridge rectifier 11 and a second terminal 122 thereof is connected to the second AC input terminal 112 of the bridge rectifier 11. A first terminal 131 of the second compensation capacitor 13 is connected to the second terminal 122 of the first compensation capacitor 12 and the second AC input terminal 112, and a second terminal 132 thereof is connected to the second rectification output terminal 114 of the bridge rectifier 11.

The LED module 14, including a plurality of LEDs connected in series and parallel, is electrically connected between the first rectification output terminal 113 of the bridge rectifier 11 and the current limiting circuit 15. The current limiting circuit 15 includes a transistor 151 and a resistor 152, in which a drain 151a of the transistor 151 is connected to the LED module 14, a source 151b of the transistor 151 is connected to a first terminal 152a of the resistor 152, a gate 151c of the transistor 151 is connected to a second terminal 152b of the resistor 152, and the second terminal 152b of the resistor 152 is connected to the second rectification output terminal 114. Alternatively, the current limiting circuit 15 may be formed in other types of circuit and is not limited to what is exampled in this embodiment. The other types of current limiting circuit may be applied in the invention. For example, a current limiting circuit merely including a resistor is capable of providing the effect of limiting the current.

According to the LED driver circuit of the invention, the first compensation capacitor 12 and the second compensation capacitor 13 may be utilized to compensate current waveform distortion as the AC input power Vin is at a low value. In the invention, the first compensation capacitor 12 and the second compensation capacitor 13 are designed in a smaller capacitance value such that the voltage sum across the first compensation capacitor 12 and the second compensation capacitor 13 is not bigger than a peak voltage of the AC input power Vin. As such, before the AC input power Vin enters into a next period, the energy in the first compensation capacitor 12 and the second compensation capacitor 13 has been discharged completely. Therefore, it will not boost the voltage of the AC input power Vin for two times. Hence, the functions of the first compensation capacitor 12 and the second compensation capacitor 13 are mainly to reduce the total current harmonic distortion and to increase the utilization rate of the LED module 14.

Figure 2A:
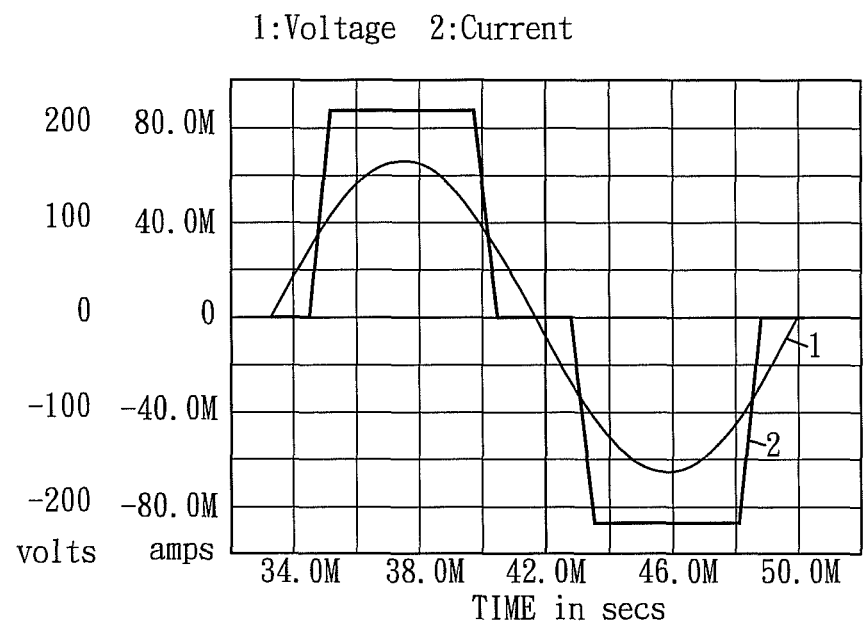
FIGS. 2(a) and 2(b) respectively show waveform diagrams of voltage and current of an AC input power when not adding and when adding a first and a second compensation capacitors according to an LED driver circuit of the invention.
Figure 2B:
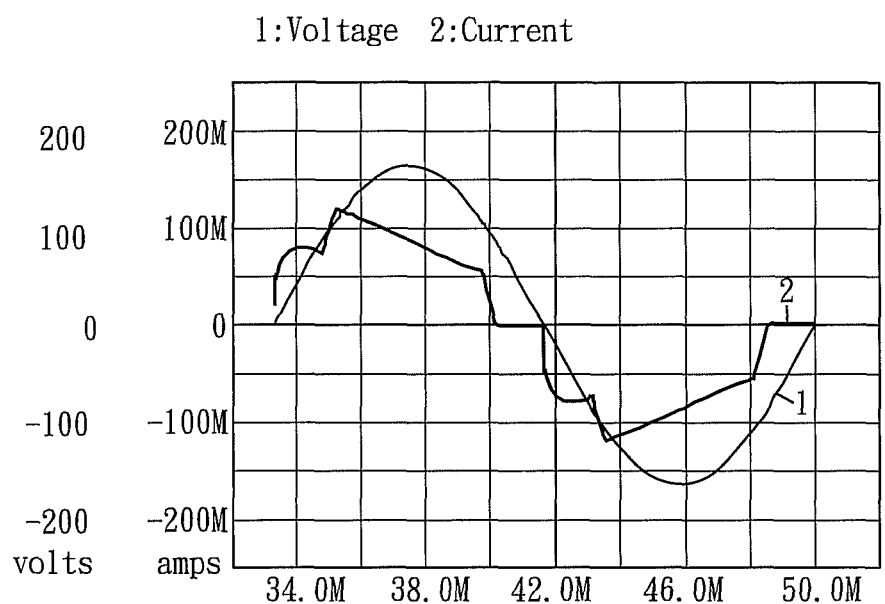
Figure 3A:
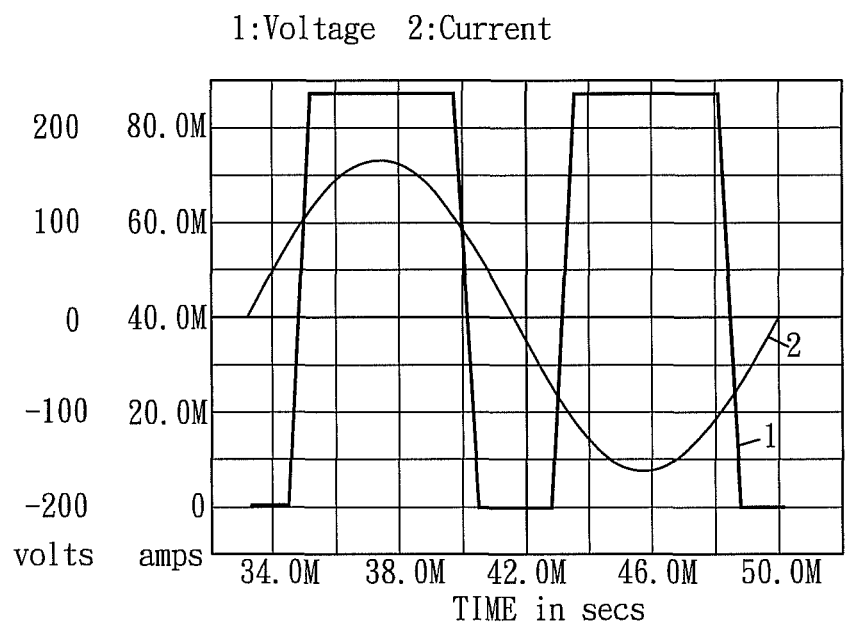
FIGS. 3(a) and 3(b) respectively show waveform diagrams of voltage and current of an LED module when not adding and when adding a first and a second compensation capacitors according to the LED driver circuit of the invention.
Figure 3B:
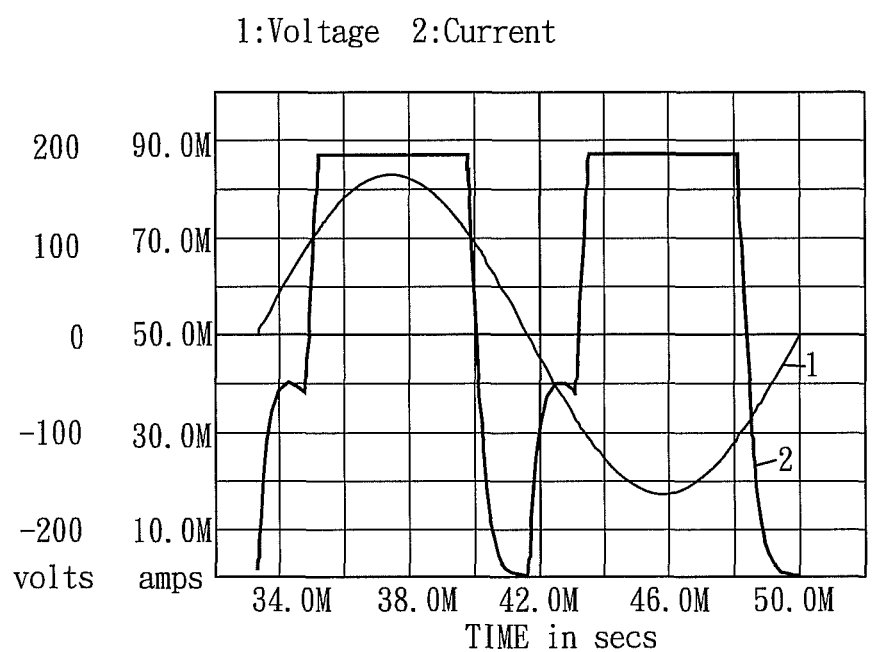

To clearly interpret the effects of the invention, the following waveform diagrams are submitted. Please refer to FIGS. 2 and 3. FIGS. 2(a) and 2(b) respectively show waveform diagrams of voltage and current of the AC input power Vin when not adding and when adding the first compensation capacitor 12 and the second compensation capacitor 13. FIGS. 3(a) and 3(b) respectively show waveform diagrams of voltage and current of the LED module 14 when not adding and when adding the first compensation capacitor 12 and the second compensation capacitor 13 according to the LED driver circuit of the invention.

As shown, when not adding the first compensation capacitor 12 and the second compensation capacitor 13, the LED module 14 is in a low current value at the time of 33.0M to 35.0M and 41.0M to 43.0M (time in seconds). Thus, the LED module 14 has higher total current harmonic distortion and is easily subjected to flicker during this time interval. When adding the first compensation capacitor 12 and the second compensation capacitor 13, the current of the LED module 14 is increased at the time of 33.0M to 35.0M and 41.0M to 43.0M. Thus, the total current harmonic distortion of the LED module 14 is decreased and its utilization rate is increased.

FIGS. 4(a) and 4(b) respectively show circuit feature lists when not adding and when adding the first compensation capacitor 12 and the second compensation capacitor 13 according to the LED driver circuit of the invention, wherein the LED module 14 includes 33 LEDs connected in series, each having a nominal value of 20 mA and 0.08 W, while the total rated power is approximately 2.7 Watts. Each of the first compensation capacitor 12 and the second compensation capacitor 13 has a capacitance value of 270 n. No matter when 100 V, 110 V or 120 V is used for the AC input power Vin, it may be clearly seen from FIGS. 4(a) and 4(b) that an AC power input factor (Pin), a power ($P_{LED}$) of the LED module 14, efficiency and a wattage variation rate of the LED according to the invention are effectively enhanced, as compared with the situation of not adding the first compensation capacitor 12 and the second compensation capacitor 13, while the total current harmonic distortion (TUB) of the invention is effectively reduced.

Figure 5:
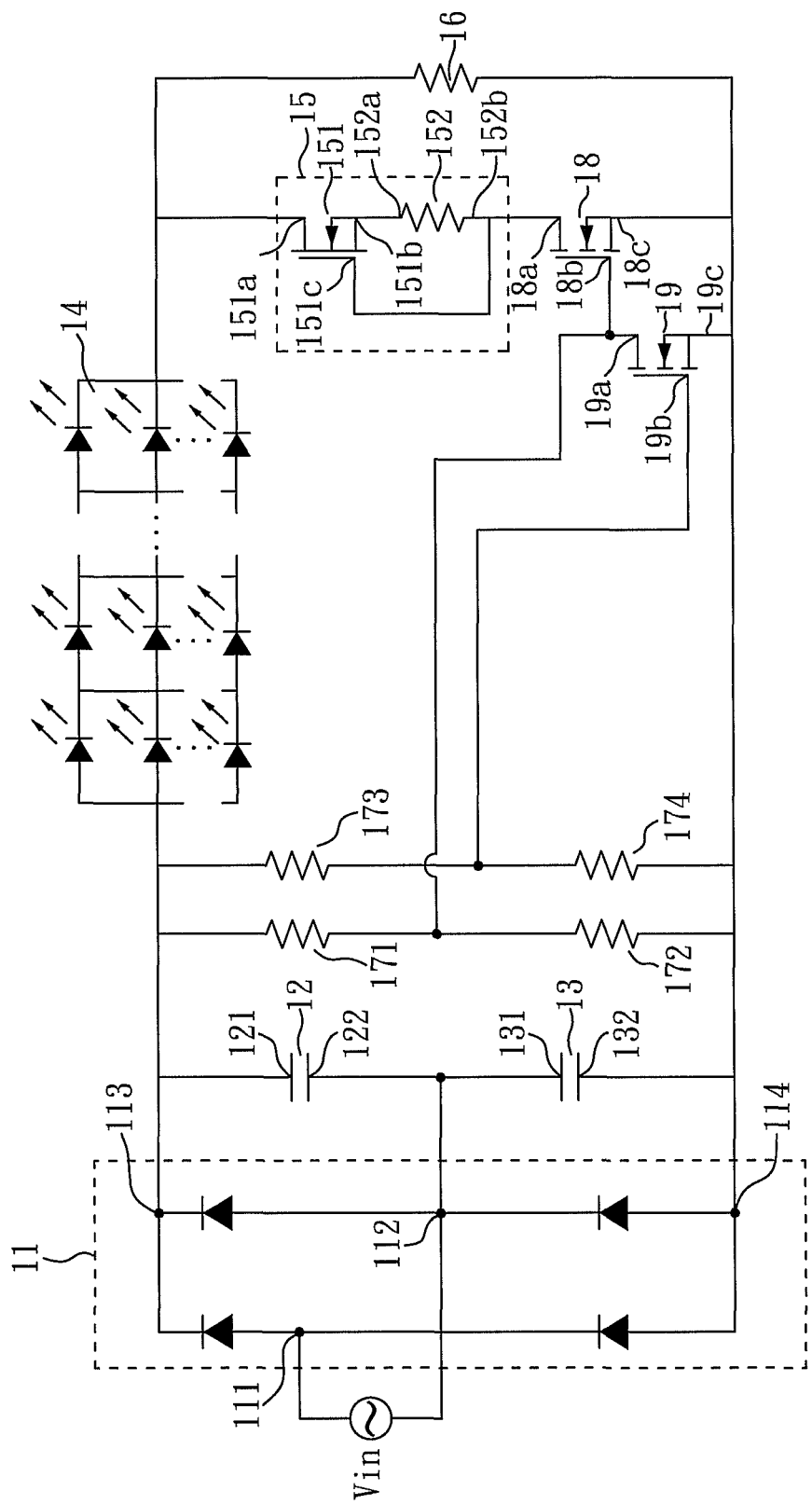
FIG. 5 is a circuit diagram of the LED driver circuit according to a second embodiment of the invention.

The LED driver circuit 1 of the invention may be applied to other circuit structures to further enhance its performance. Please refer to the second embodiment as shown in FIG. 5. As shown, the circuit structure of this embodiment is basically the same as that of the first embodiment, except that a high impedance resistor 16, a first, a second, a third and a fourth voltage-divided resistors 171-174, a second transistor 18 and a third transistor 19 are added.

In this embodiment, the first voltage-divided resistor 171 and the second voltage-divided resistor 172 are connected in series, and the third voltage-divided resistor 173 and the fourth voltage-divided resistor 174 are also connected in series. The first voltage-divided resistor 171 and the second voltage-divided resistor 172 connected in series are connected between the first rectification output terminal 113 and the second rectification output terminal 114. The third voltage-divided resistor 173 and the fourth voltage-divided resistor 174 connected in series are also connected between the first rectification output terminal 113 and the second rectification output terminal 114. In the second transistor 18, a drain 18a thereof is connected to the second terminal 152b of the resistor 152, a gate 18b thereof is connected to a joint of the first voltage-divided resistor 171 and the second voltage-divided resistor 172, and a source 18c thereof is connected to the second rectification output terminal 114. In the third transistor 19, a drain 19a thereof is connected to the gate 18b of the second transistor 16, a gate 19b thereof is connected to a joint of the third voltage-divided resistor 173 and the fourth voltage-divided resistor 174, and a source 19c thereof is connected to the second rectification output terminal 114. The second transistor 18 and the third transistor 19 are turned on and off based on the voltage across the second voltage-divided resistor 172 and the fourth voltage-divided resistor 174, respectively.

Figure 6A:
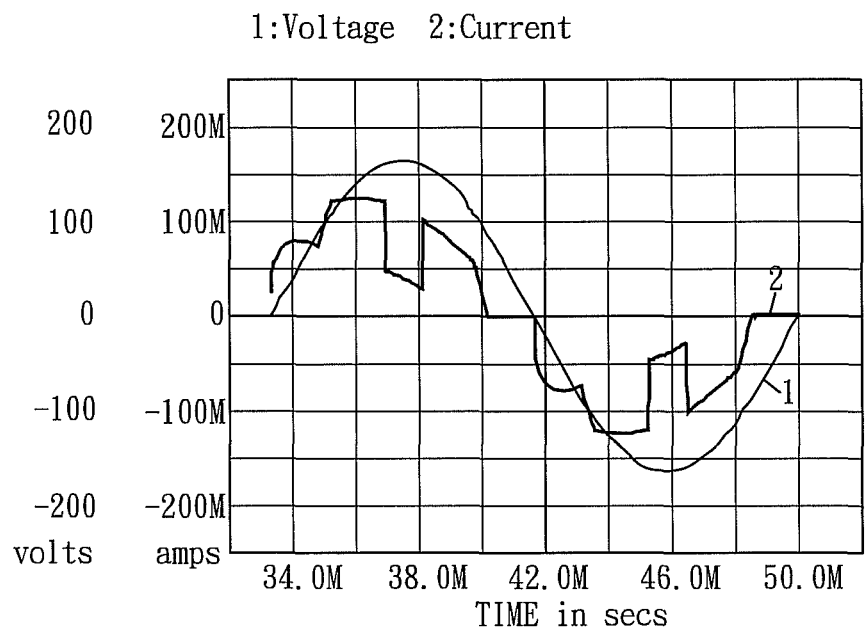
FIG. 6(a) is a waveform diagram of voltage and current of an AC input power according to the second embodiment of the invention.
Figure 6B:
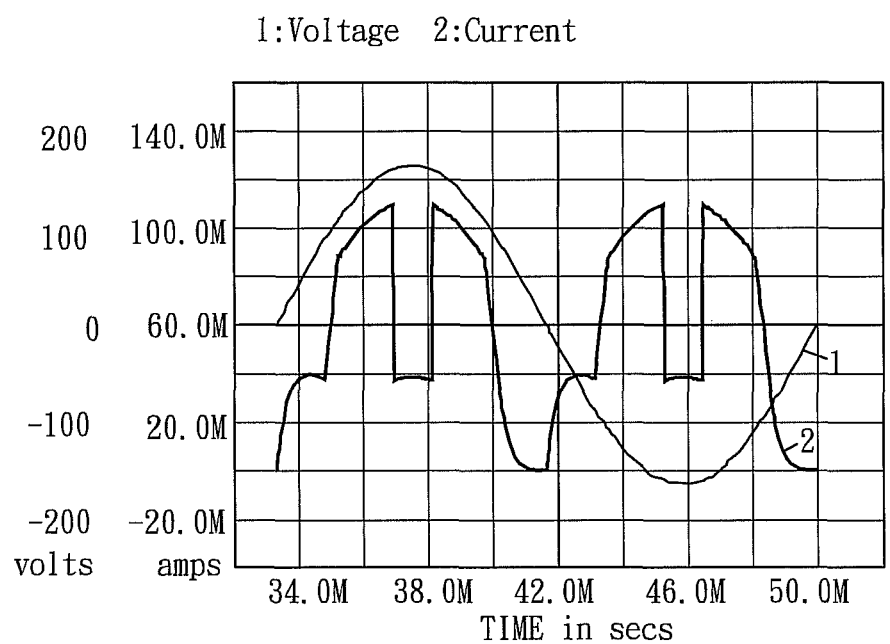
FIG. 6(b) is a waveform diagram of voltage and current of an LED module according to the second embodiment of the invention.

The waveform diagrams of this embodiment are shown in FIGS. 6(a) and 6(b). FIG. 6(a) is a waveform diagram of voltage and current of an AC input power Vin according to the second embodiment of the invention and FIG. 6(b) is a waveform diagram of voltage and current of the LED module 14 according to the second embodiment of the invention. As shown in FIG. 6(b), as compared with the current and voltage waveform diagram (as shown in FIG. 3(a)) of not adding the first compensation capacitor 12 and the second compensation capacitor 13, the current in the LED module 14 according to this embodiment is increased at the time of 40.0M to 44.0M. Thus, the total current harmonic distortion of the LED module 14 is decreased and its utilization rate is increased. For example, as the input voltage is higher than a predetermined value, the third transistor 19 is turned on, rendering the second transistor 18 being turned off. At this moment, the LED module 14 is in series connection with the high impedance resistor 16. Due to that the high impedance resistor 16 provides a route of higher impedance, the consuming power of the LED module 14 is effectively suppressed. Therefore, such a circuit is capable of suppressing larger variation of the input voltage and avoiding damage to the LED module 14 due to overheating, resulting from consuming larger power when the input power is too large.

Figure 7:
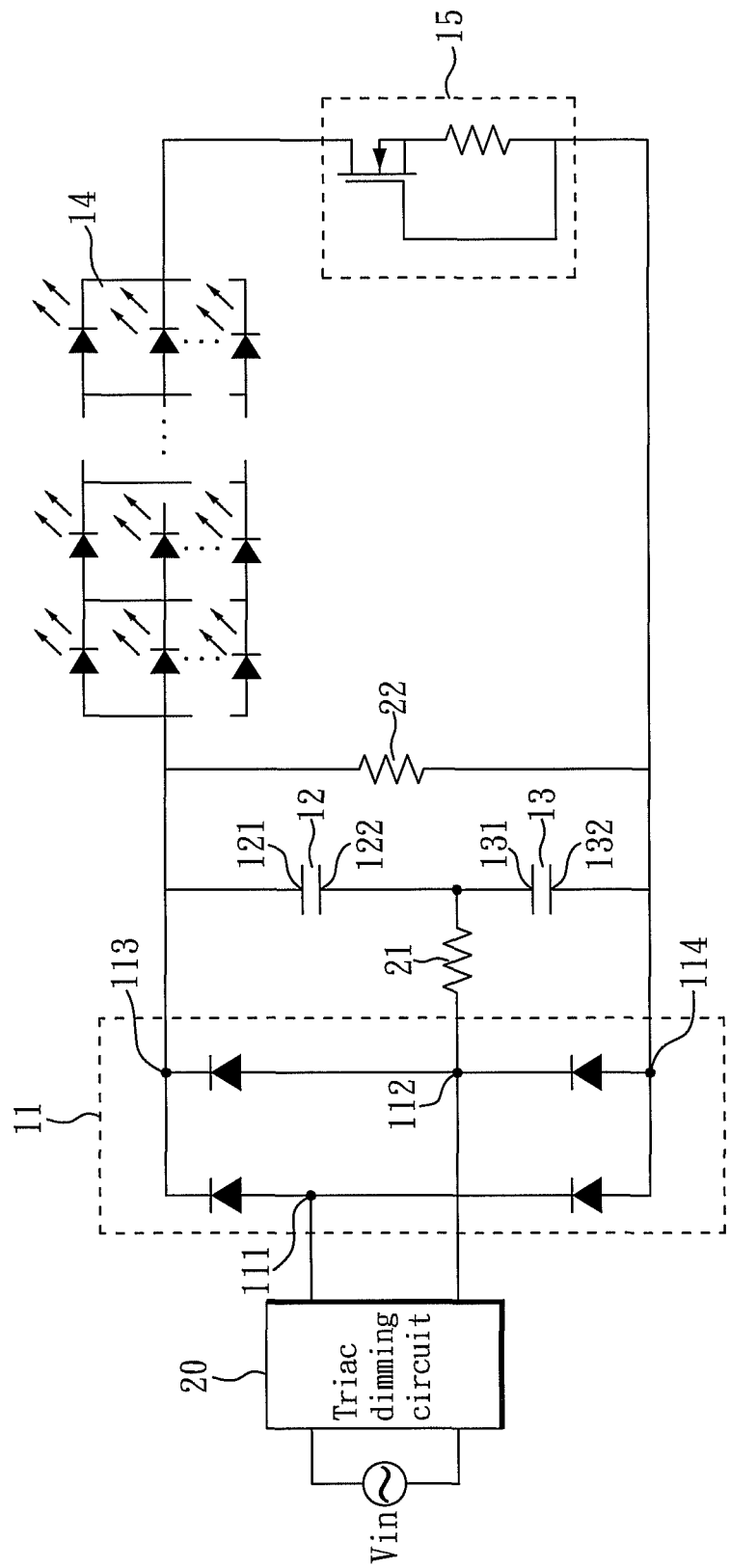
FIG. 7 is a circuit diagram of the LED driver circuit according to a first embodiment of the invention a third embodiment of the invention.

The LED driver circuit 1 of the invention may be applied to a Triac dimming circuit. Please refer to the third embodiment shown in FIG. 7. As shown, the circuit structure of this embodiment is basically the same as that of the first embodiment, except that a Triac dimming circuit 20, a first resistor 21 and a second resistor 22 are added. The Triac dimming circuit 20 is connected to the AC input power Vin. The first resistor 21 is connected between the second AC input terminal 112 and a joint of the first compensation capacitor 12 and the second compensation capacitor 13. The second resistor 22 is connected between the first rectification output terminal 113 and the second rectification output terminal 114. Similarly, due to adding the first compensation capacitor 12 and the second compensation capacitor 13, the total current harmonic distortion of the LED module 14 is decreased and its utilization rate is increased, as compared with the condition of not adding the first compensation capacitor 12 and the second compensation capacitor 13. The first resistor 21 is used to suppress surge current incurred on the first compensation capacitor 12 and the second compensation capacitor 13 at the time of light adjustment by the Triac dimming circuit 20 and the second resistor 22 is used to avoid flicker, resulting from a lower conduction angle of the Triac dimming circuit 20 during light adjustment. Therefore, through the aid of incorporating the Triac dimming circuit 20 with the first compensation capacitor 12 and the second compensation capacitor 13, the utilization efficiency of the circuit is effectively enhanced.

Although the present invention has been explained in relation to its preferred embodiments, it is to be understood that many other possible modifications and variations can be made without departing from the scope of the invention as hereinafter claimed.

What is claimed is:

1. An LED driver circuit, comprising:
  a bridge rectifier including a first AC input terminal, a second AC input terminal, a first rectification output terminal and a second rectification output terminal, in which the first and the second AC input terminals are provided to receive an AC input power, and the first and the second rectification output terminals are provided to produce a rectification output power;
  a first compensation capacitor having a first terminal connected to the first rectification output terminal of the bridge rectifier and a second terminal connected to the second AC input terminal of the bridge rectifier;
  a second compensation capacitor having a first terminal connected to the second terminal of the first compensation capacitor and a second terminal connected to the second rectification output terminal of the bridge rectifier; and
  an LED module connected between the first and the second rectification output terminals of the bridge rectifier;
  wherein each of the first and the second compensation capacitors has a predetermined capacitance value such that a voltage sum across the first and the second compensation capacitors is not bigger than a peak voltage of the AC input power.

2. The LED driver circuit as claimed in claim 1, wherein the LED module includes a plurality of LEDs connected in series and parallel.

3. The LED driver circuit as claimed in claim 1, wherein the bridge rectifier includes a first diode, a second diode, a third diode and a fourth diode, in which cathodes of the first and the second diodes are connected to the first rectification output terminal, anodes of the first and the second diodes are respectively connected to the first AC input terminal and the second AC input terminal, cathodes of the third and the fourth diodes are respectively connected to the second AC input terminal and the first AC input terminal, and anodes of the third and the fourth diodes are connected to the second rectification output terminal.

4. The LED driver circuit as claimed in claim 3, wherein each of the first, the second, the third and the fourth diodes is an LED.

5. An LED driver circuit, comprising:
  a bridge rectifier including a first AC input terminal, a second AC input terminal, a first rectification output terminal, and a second rectification output terminal, in which the first and the second AC input terminals are provided to receive an AC input power, and the first and the second rectification output terminals are provided to produce a rectification output power;
  a first compensation capacitor having a first terminal connected to the first rectification output terminal of the bridge rectifier and a second terminal connected to the second AC input terminal of the bridge rectifier;
  a second compensation capacitor having a first terminal connected to the second terminal of the first compensation capacitor and a second terminal connected to the second rectification output terminal of the bridge rectifier;
  an LED module connected to the first rectification output terminals of the bridge rectifier;
  a current limiting circuit including a first transistor and a first resistor, in which a drain of the first transistor is connected to the LED module, a source of the first transistor is connected to a first terminal of the first resistor, and a gate of the first transistor is connected to a second terminal of the first resistor;

series-connected first voltage-divided resistor and second voltage-divided resistor connected between the first and the second rectification output terminals;

series-connected third voltage-divided resistor and fourth voltage-divided resistor connected between the first and the second rectification output terminals;

a second transistor having a drain connected to the second terminal of the first resistor, a gate connected to a joint of the first voltage-divided resistor and the second voltage-divided resistor, and a source connected to the second rectification output terminal;

a third transistor having a drain connected to the gate of the second transistor, a gate connected to a joint of the third voltage-divided resistor and the fourth voltage-divided resistor, and a source connected to the second rectification output terminal; and a second resistor connected between the LED module and the second rectification output terminal.

6. The LED driver circuit as claimed in claim 5, wherein the second resistor is a high impedance resistor.

7. An LED driver circuit, comprising:

a dimming circuit having an input for receiving an AC input power and an output for producing an adjusted AC input power;

a bridge rectifier including a first AC input terminal, a second AC input terminal, a first rectification output terminal, and a second rectification output terminal, in which the first and the second AC input terminals are provided to receive the adjusted AC input power, and the first and the second rectification output terminals are provided to produce a rectification output power;

a first resistor having a first terminal connected to the second AC input terminal;

a first compensation capacitor having a first terminal connected to the first rectification output terminal of the bridge rectifier and a second terminal connected to a second terminal of the first resistor;

a second compensation capacitor having a first terminal connected to the second terminal of the first resistor and a second terminal connected to the second rectification output terminal of the bridge rectifier;

a second resistor connected between the first and the second rectification output terminals;

an LED module connected to the first rectification output terminals of the bridge rectifier; and a current limiting circuit including a transistor and a third resistor, in which a drain of the transistor is connected to the LED module, a source of the transistor is connected to a first terminal of the third resistor, a gate of the transistor is connected to a second terminal of the third resistor, and the second terminal of the third resistor is connected to the second rectification output terminal.

8. An LED driver circuit, comprising:

a bridge rectifier including a first AC input terminal, a second AC input terminal, a first rectification output terminal and a second rectification output terminal, in which the first and the second AC input terminals are provided to receive an AC input power, and the first and the second rectification output terminals are provided to produce a rectification output power;

a first compensation capacitor having a first terminal connected to the first rectification output terminal of the bridge rectifier and a second terminal connected to the second AC input terminal of the bridge rectifier;

a second compensation capacitor having a first terminal connected to the second terminal of the first compensation capacitor and a second terminal connected to the second rectification output terminal of the bridge rectifier;

an LED module connected between the first and the second rectification output terminals of the bridge rectifier; and a current limiting circuit connected between the LED module and the second terminal of the second compensation capacitor;

wherein the current limiting circuit includes a transistor and a resistor, in which a drain of the transistor is connected to the LED module, a source of the transistor is connected to a first terminal of the resistor, a gate of the transistor is connected to a second terminal of the resistor, and the second terminal of the resistor is connected to the second rectification output terminal.

9. The LED driver circuit as claimed in claim 8, wherein the LED module includes a plurality of LEDs connected in series and parallel.

10. The LED driver circuit as claimed in claim 8, wherein the bridge rectifier includes a first diode, a second diode, a third diode and a fourth diode, in which cathodes of the first and the second diodes are connected to the first rectification output terminal, anodes of the first and the second diodes are respectively connected to the first AC input terminal and the second AC input terminal, cathodes of the third and the fourth diodes are respectively connected to the second AC input terminal and the first AC input terminal, and anodes of the third and the fourth diodes are connected to the second rectification output terminal.

11. The LED driver circuit as claimed in claim 10, wherein each of the first, the second, the third and the fourth diodes is an LED.

* * * * *